(12) United States Patent
Okouchi

(10) Patent No.: US 7,442,146 B2
(45) Date of Patent: Oct. 28, 2008

(54) INTERNALLY GEARED BICYCLE HUB

(75) Inventor: Hiroyuki Okouchi, Osaka (JP)

(73) Assignee: Shimano Inc., Osaka (JP)

( * ) Notice: Subject to any disclaimer, the term of this patent is extended or adjusted under 35 U.S.C. 154(b) by 353 days.

(21) Appl. No.: 11/341,851

(22) Filed: Jan. 30, 2006

(65) Prior Publication Data

US 2006/0229155 A1  Oct. 12, 2006

(30) Foreign Application Priority Data

Jan. 27, 2005  (EP)  .................................. 05001721

(51) Int. Cl.
*F16H 3/44* (2006.01)
*B60B 27/00* (2006.01)
(52) U.S. Cl. .................................. 475/318; 301/110.5
(58) Field of Classification Search .................. 475/318; 301/110.5
See application file for complete search history.

(56) References Cited

U.S. PATENT DOCUMENTS 6,352,314 B1 * 3/2002 Tabe ........................ 301/110.5
6,409,281 B1 * 6/2002 Kanehisa et al. ........... 301/110.5
6,783,192 B2 * 8/2004 Meggiolan ................ 301/110.5
7,029,075 B2 * 4/2006 Kuan et al. ................ 301/110.5
2002/0067068 A1   6/2002 Kanehisa et al.
2004/0171454 A1   9/2004 Itou et al.

FOREIGN PATENT DOCUMENTS

| EP | 0 876 953 A2 | 5/1998 |
| EP | 1 211 102 A2 | 10/2001 |
| EP | 1 452 437 A1 | 2/2003 |
| JP | 54-008340 | 1/1979 |

* cited by examiner

*Primary Examiner*—Tisha D Lewis
(74) *Attorney, Agent, or Firm*—Global IP Counselors, LLP

(57) ABSTRACT

An internally geared bicycle hub is provided with a hub axle, a hub body, a drive member and a gear mechanism for transmitting a rotational drive force from the drive member to the hub body. The hub body and the drive member are mounted in a radially uncoupled manner to the hub axle, so as to be coupled to the gear mechanism. The drive member is supported by axially spaced bearing assemblies, positioned on the inner side of the drive member.

17 Claims, 4 Drawing Sheets

INTERNALLY GEARED BICYCLE HUB

BACKGROUND OF THE INVENTION

1. Field of the Invention

This invention generally relates to a transmission for a bicycle. More specifically, the present invention relates to an internally geared hub for a bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Some bicycles are equipped with a transmission for making riding up and down hills easier. One type of bicycle transmission component is an internal hub transmission that is commonly known as an internally geared hub. The internally geared hub has been extensively redesigned over the years.

Bicycles, particularly recreational bicycles referred to as city cruisers, are inexpensive and are easy to ride, and are thus widely used to commute to work or school or for shopping. With this type of recreational bicycle, the internally geared hub is sometimes used in order to ride at high speeds over flat terrain or to ride uphill with minimal exertion.

The internally geared hub generally comprises a hub axle fixed to a bicycle frame and a hub body rotatable about the hub axle. A planetary gear mechanism is housed within the hub body by which rotational drive force can be communicated to the hub body through various transmission paths defined by the planetary gear mechanism. A clutch mechanism including a clutch member is usually provided for selecting the transmission path by selected axial movement of the clutch member, for example by a push rod.

One example of a hub transmission of the above type is disclosed in the European Patent Application No. 0 876 953, where additional structures are provided for facilitating actuation of the clutch member.

In this most conventional hub transmission, the drive member is always in engagement with the clutch member, such that during back pedaling rotation in the backward direction results in reverse rotation not being smooth and somewhat heavy. In order to overcome this drawback, it has been proposed in European Patent Application No. 1 452 437 that an internally geared bicycle hub be configured with a drive member that is rotatably mounted around a hub axle. A hub body is also mounted to rotate about the hub axle, with a planetary gear mechanism being provided for communicating forward rotational force from the drive member to the hub body through various force transmission paths. The planetary gear mechanism includes a planet gear supported by a planet gear carrier for a rotation around the hub axle, a ring gear engaging the planet gear and a sun gear disposed on the hub axle. A clutch member is provided to be movable in axial direction of the axle. Furthermore, a pawl body is arranged between the drive member and the clutch member. A first one-way clutch is arranged to transmit forward rotational drive force from the drive member to the pawl body. Accordingly, the drive member always engages the clutch member through the first one-way clutch to transmit forward rotational motion to the clutch member in any of the selected gear speeds. On the other hand, the first one-way clutch uncouples the drive member from the clutch member when reverse rotational motion is applied to the drive member through back-pedaling. This could, for example, be realized by providing a pawl body between the drive member and the clutch member, where the first one-way clutch is arranged on the pawl body. Consequently it was presumed that the drive member would run smoothly and lightly when back-pedaling because the internal components of the hub transmission are substantially disengaged from the drive member. A smooth backward running of the hub transmission was therefore obtained, which is nearly as light as for example a free hub commonly used with a derailleur.

Although the above described internally geared hub is satisfactory for most applications and even though it allows as described to provide for mounting additionally a multistage sprocket assembly, it has been found that smooth running cannot be always guaranteed, in particular in cases where a large number of sprockets should be mounted to the drive member or in cases where the weight of the bicycle rider is high. In those cases a bending moment can be induced in the internally geared hub, in particular in the drive member or relatively between the mutually coupled hub body and drive member resulting in drag or a heavy running.

In view of the above, it will be apparent to those skilled in the art from this disclosure that there exists a need for an improved internally geared hub. This invention addresses this need in the art as well as other needs, which will become apparent to those skilled in the art from this disclosure.

SUMMARY OF THE INVENTION

One object of the present invention is to provide an internally geared hub with improved running condition.

According to the present invention the above object is solved by providing within an internally geared hub that basically includes a hub axle, a hub body, a drive member and a gear mechanism. The hub body is coaxially mounted on the hub axle to rotate relative to the hub axle. The drive member is coaxially mounted on the hub axle to rotate relative to the hub axle by a pair of axially spaced drive member bearings positioned on an inner side of the drive member. The gear mechanism is configured and arranged between the drive member and the hub body to selectively transmit a rotational drive force from the drive member to the hub body.

In configuration, the invention provides for the omission of any radial link between the hub body and the drive member such that no radially inwardly directed forces may be transmitted from the hub body to the drive member, whereas also no forces can be transmitted in a radially outwardly directed direction from the drive member to the hub body. At the same time any bending or tilting of the drive member can effectively be avoided as two axially spaced bearing assemblies provide for an internal support of the drive member in order to maintain a fully coaxial disposition.

In a preferred embodiment, the hub body exclusively coupled to the hub axle on one end thereof whereas at the other end the hub body is supported or coupled with respect to the hub axle via the gear mechanism only and not by way of the drive member as it was usual practice according to the prior art. Concurrently the drive member is coupled or supported with respect to the hub axle at one end and at the other end via the gear mechanism. Most preferably, the hub body and the drive member are supported by a common part of the gear mechanism. That common part is preferably provided in such a manner as not to allow substantial force transmission. This can be accomplished, for example, by having the common part journaled almost free of tolerances. Preferably, no substantial levers are present with respect to the engagement of the hub body and/or the drive member to the gear mechanism.

According to a preferred embodiment, the hub body is mounted to the hub axle via the gear mechanism such that at least the end portion adjacent to the drive member is fully supported. In other words, radial forces exerted by the sprockets to the hub body are transmitted via the gear mechanism to the hub axle without impairing the drive member. A further beneficial effect of having the hub body fully supported by the gear mechanism to the hub axle is that adjustment can be performed easier and existing tolerances can be handled separately with respect to the mounting of the hub body as compared to the mounting of the drive member. This being particularly beneficial in cases where the drive member is having a large axial extension, so as to accommodate a plurality of sprockets thereon.

In order to provide a tight fit of the drive body with respect to the hub axle, it is preferred that the drive member is supported on its proximal end portion or on its end portion adjacent to the hub body with respect to the hub axle. The provision of a support using for instance a bearing assembly on one or both end portions of the drive members effectively avoids any bending of the drive member as the drive member and the hub axle form a fully supported coaxial disposition comparable to a sleeve fitted around the hub axle.

Preferably, the bearing assembly can be positioned respectively on the end portions and/or an opposite sides of a clutch element being associated to the drive member in order to be coupled to the gear mechanism. More preferably, the clutch element is a one-way clutch such as the one described in European Patent Application No. 1 452 437 A1.

In order to provide for both radial support of the drive member as well as for a defined axial positioning of the drive member, it is preferred that at least one of the bearing assemblies is an angular contact bearing.

In a more preferred embodiment, at least two of the bearing assemblies are angular contact bearings having particularly opposite angularity. In other words, the two bearing assemblies supporting the drive member on its respective end portions can also provide for a firm and tight fit of the drive member onto the hub axle in either axial direction.

Since the decoupling with respect to radial forces between the hub body and the drive member allows the drive member to be longer without risking unsmooth running or bending it is particularly preferred that a plurality of sprockets is provided on the drive member, in particular it is possible to provide three, and more particularly five, six or up to seven sprockets, such that the internally geared hub may be combined with a multistage sprocket assembly allowing a large number of speed changing settings.

In order to obtain a compact design it is possible to consider that the drive member extends partly into a recess of the gear mechanism being accordingly formed as an annular recess. The above configuration also protects the gear mechanism and the bearing assembly(s) with respect to water, dirt or dust.

According to a preferred embodiment, the gear mechanism is having a portion extending in a gap formed between the drive member and the hub body. This configuration can be particularly usable as it allows external detection of the shifting situation of the internally geared hub.

In order to further improve the running characteristics of the gear mechanism, it is preferred that a portion thereof extends substantially between two substantially co-axial bearing assemblies. In particular, co-axial bearing assemblies are substantially positioned in one radial plane with respect to the hub axle. The provision of a portion of a gear mechanism substantially between two bearing assemblies allows for perfect co-axial fit of the gear mechanism and furthermore provides for structural integrity of the internally geared hub as even if strong forces would be induced via the hub body to the gear mechanism deterioration can be avoided. Preferably both of the drive member and the hub body are coupled to the hub axle via the gear mechanism close by to such a bearing assembly configuration.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Since the internal construction of the internally geared hub of the present invention is in many respects quite similar to the internally geared hub as described in European Patent Application No. 1 452 437 A1 such known internally geared hub will be described first with reference to FIGS. 1, 2 and 3.

Figure 1:
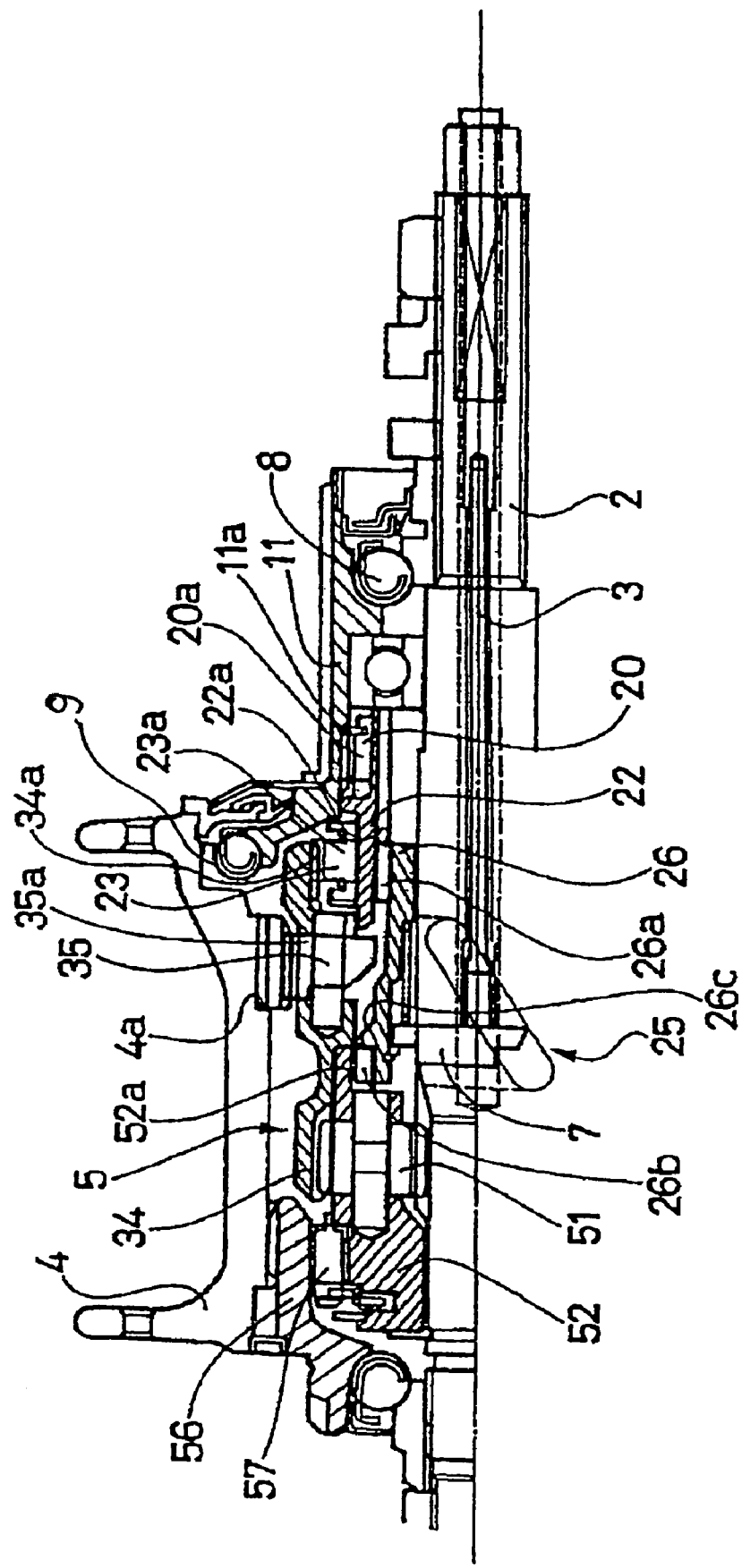
FIGS. 1 to 3 are simplified longitudinal cross section views of an internally geared hub that is known in the prior art, and more particularly, an internally geared hub configured in accordance with European Patent Application No. 1 452 437.

With reference to FIG. 1, a known hub transmission is shown with a hub axle 2 that is adapted to be fixed to a rear drop-out (not shown) of the frame body of a bicycle. A drive member 11 is disposed around and rotatably mounted on the outer periphery at one end of the hub axle 2. A hub body 4 is rotatably mounted to the hub axle 2 and a planetary gear mechanism 5 is housed in the hub body 4. A clutch control mechanism 25 provides means for selecting the power transmission path through axial adjustment of the clutch member 26.

Figure 2:
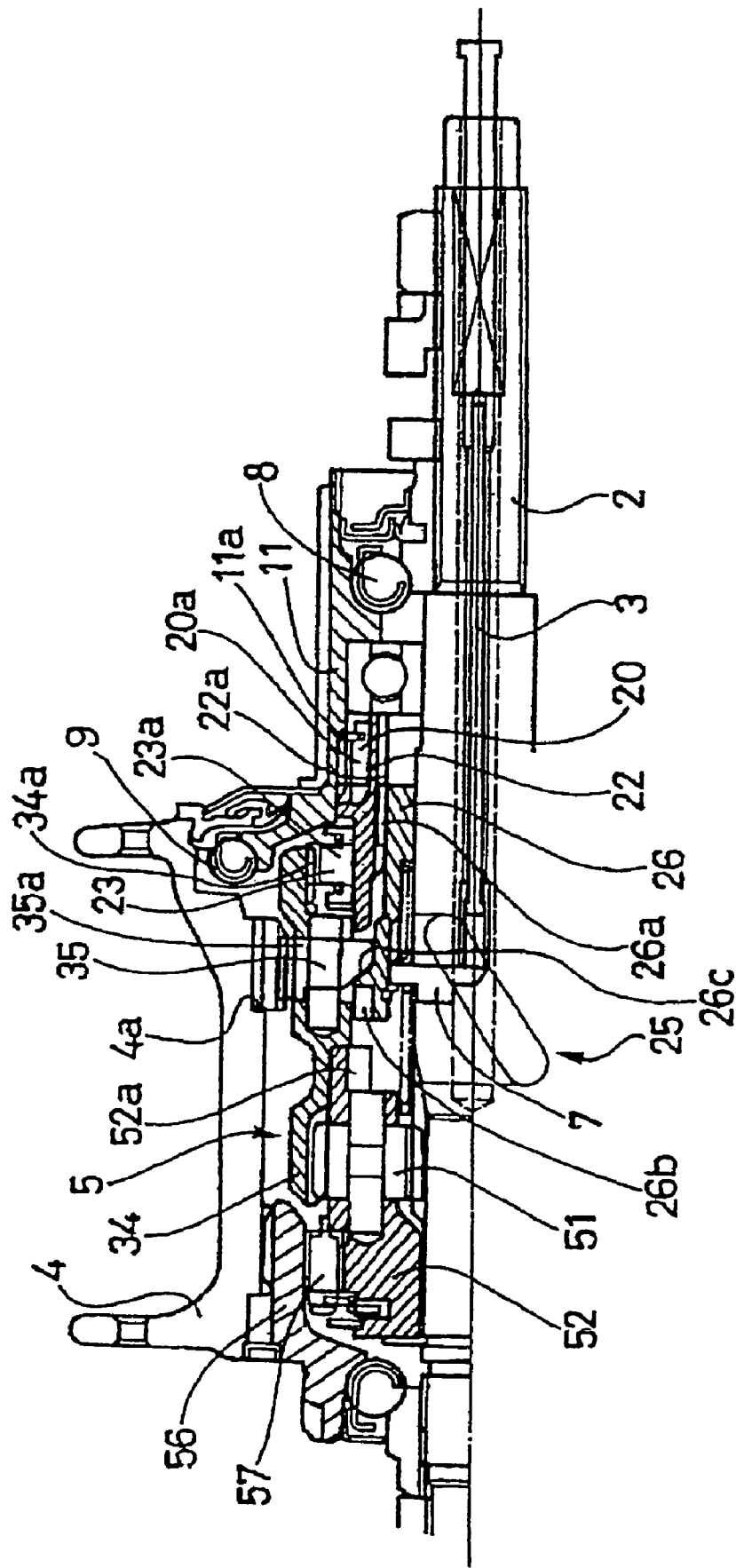
Figure 3:
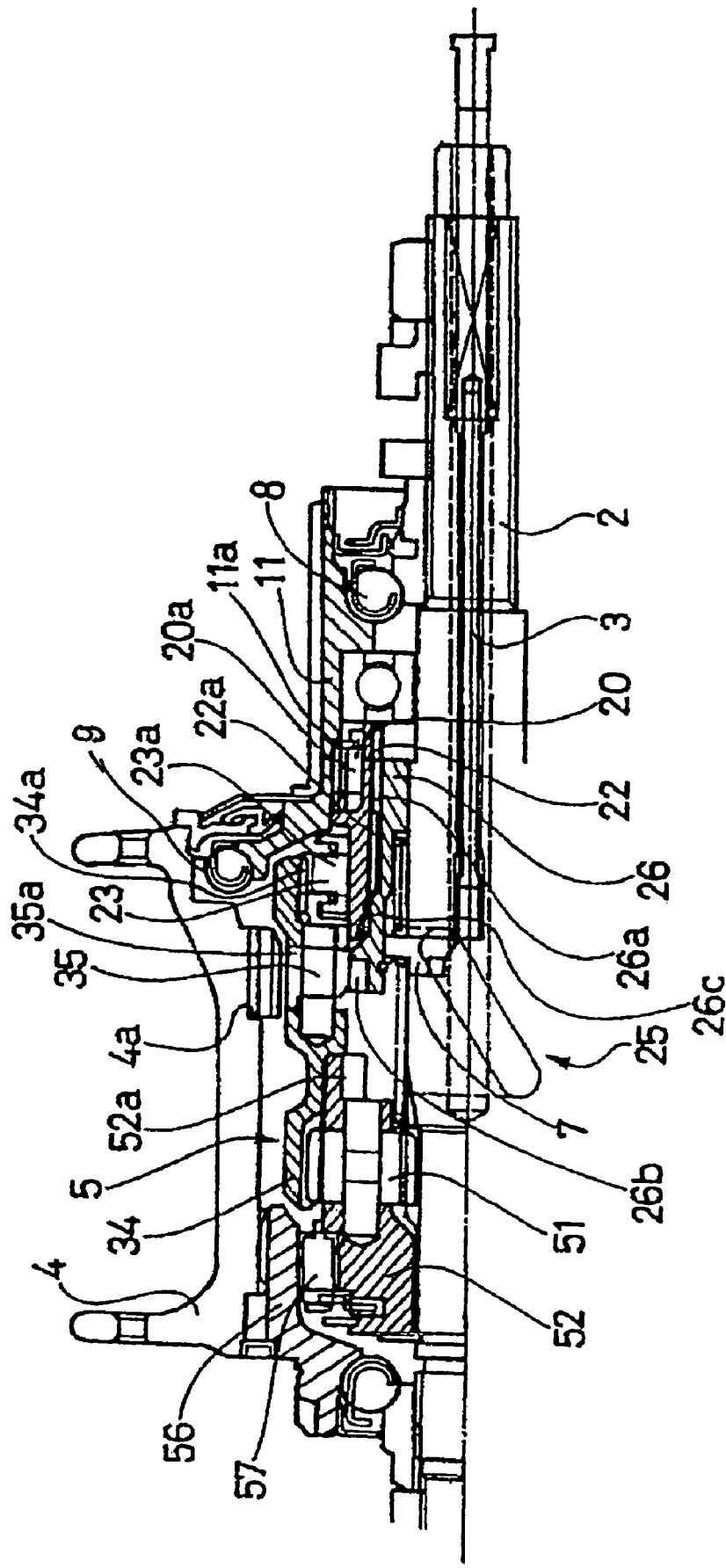

As shown in FIG. 1 as well as in FIGS. 2 and 3, the hub axle 2 is a cylinder member with a larger outer diameter at its center and a smaller outer diameter at both ends. The center of the axle 2 is provided with a bore for disposition of a control rod 3. The control rod 3 is activated at the right end in FIG. 1 by an actuator member controlled by a shift control cable (not shown). Axial movement of the control rod 3 is transmitted through a shift key 7, which extends through an axial groove of the hub axle 2. The shift key 7 engages with the clutch member 26, whereby the axial positioning of the clutch member 26 for selection of the force transmission path is accomplished.

The drive member 11 is rotatably supported on the hub axle 2 by a ball bearing assembly 8, and rotatably supports the hub body by a bearing assembly 9. Thus, the hub body 4 is also mounted in ball bearing assemblies for rotation about the hub axle 2. The hub body 4 includes radially outward extending flanges for supporting spokes (not shown) for fixation to a bicycle wheel.

The planetary gear mechanism 5 comprises a sun gear formed on the hub axle 2, a planet gear carrier 52 rotatably mounted on the outer periphery of the hub axle 2, and normally three planet gears 51 (only one planet gear is shown in FIG. 1). The planet gears 51 mesh with the sun gear as well as with an inner periphery of a ring gear 34. In addition, the planet gear carrier 52 is provided with a plurality of serration teeth 52a formed on a periphery, preferably an inner periphery, of the planet gear carrier 52 at an end facing the drive member 11. The serration teeth 52a are provided for engagement with corresponding engaging serration teeth 26b of the clutch member 26, as will be discussed below.

Again referring to FIG. 1, a first one-way clutch 20 is arranged between the drive member 11 and a pawl body 22. The first one-way clutch comprises at least one pawl 20a mounted on an outer periphery of the pawl body 22. One pawl is sufficient for rotational force transmission, however two or more pawls may be provided if desired. The pawls 20a are pivotally mounted on an outer periphery of the pawl body 22 and are spring biased so as to engage with ratchet teeth 11a on an inner periphery of the drive member 11. The ratchet teeth 11a are formed in a manner that forward rotational drive force applied to the drive member 11. The ratchet teeth 11a are formed in a manner that forward rotational drive force applied to the drive member 11 is transferred to the pawl body 22, whereas the pawls 20a disengage from the ratchet teeth 11a when reverse rotational force is present on the drive member, for example when back pedaling.

As seen in FIGS. 1, 2 and 3, the axial position of the pawl body 22 with respect to the drive member 11 remains unchanged for the high speed, normal speed and low speed positions for the hub transmission. In other words, no relative axial movement takes place between the drive member 11 and the pawl body 22. As a consequence of this arrangement, only forward rotational drive force is transferred from the drive member 11 to the internal elements of the hub transmission, whereas when the drive member 11 is rotated reversely, no or at least substantially no reverse rotational drive force is transmitted. In this manner, an extremely smooth and light running condition is achieved when back pedaling with the present hub transmission. Only the drive member 11 itself runs in reverse, while the clutch member 26 is decoupled from the drive member 11 by the one-way clutch 20. In particular, in the high speed condition shown in FIG. 1, not only the clutch member 26 is decoupled from the drive member 11 but also the planet gear carrier 52 which is engaged with the clutch member 26. This light running of the drive member 11 is of importance when several chain sprockets are mounted externally on the drive member 11.

A second one-way clutch 23 is arranged between the pawl body 22 and the ring gear 34 as is seen in FIG. 1. The second one-way clutch 23 comprises at least two pawls 23a which are pivotally mounted on an outer periphery of the pawl body 22. The pawls 23a are spring biased to engage with ratchet teeth 34a formed on an inner periphery of the ring gear 34. In this embodiment, two pawls 23a are employed, while in practice four pawls or more may be provided depending on the situation, i.e. depending on the force to be transferred.

As seen in FIGS. 1, 2 and 3, the ring gear 34 remains fixed in axial direction, while being rotatably mounted about the axle 2. The ring gear 34 extends from a position of the planet gears 51 at one end (left side in FIG. 1) to a position adjacent to the drive member 11 at the other end. At the one end of the ring gear 34, inner peripheral teeth are provided which mesh with the planet gears 51. The ring gear 34 is also provided with a third one-way clutch 35 which comprises at least one clutch pawl 35a, which is biased in the standing or erected position by a coil spring. The clutch pawl or pawls 35a engage with ratchet teeth 4a on an inner periphery of the hub body 4. The clutch pawl 35a meshes with the ratchet teeth 4a when the ring gear 34 is rotated in the forward drive direction. In this third one-way clutch 35, however, the clutch pawl or pawls 35a can be placed in a power transmission state or a power interruption as will be discussed below. In the power transmission state, forward drive rotation is transferred from the ring gear to the pawl 35a and the ratchet teeth 4a to the hub body 4. In the power interruption state, the clutch pawl 35a is knocked down by a switching portion 26c of the clutch member 26 as shown in FIG. 3. In this power interruption state, no forward or reverse rotational drive force can be transmitted to the ratchet teeth 4a of the hub body.

The operation of the hub transmission will now be described according to three forward speeds. It will however be apparent to the skilled person that the arrangement of the one-way clutch between the drive member 11 and the pawl body 22 can be provided in hub transmissions having any number of speeds.

FIG. 1 shows the high speed transmission path. Forward rotational force applied to the drive member 11 is transmitted through the one-way clutch 20 to the pawl body 22 which in turn transmits the force to the clutch member 26 via the serration teeth 26a. The clutch member 26 has been placed by the clutch control mechanism 25 in an axial position to the left in FIG. 1. In this position the engaging serration teeth 26b of the clutch member 26 engage with the serration teeth 52a on the planet gear carrier 52. Rotation is then transmitted from the planet gear carrier 52 via the planet gear mechanism 5 to the ring gear 34 and subsequently to the third one-way clutch 35 which is in the erected state, i.e., in the power transmission state. Finally, the one-way clutch 35 transfers the forward drive force to the hub body 4.

In this case, the input rotation is increased in speed and then output according to the gear ratio determined by the numbers of teeth on the sun gear, the planet gears 51 and the ring gear 34. In the condition shown in FIG. 1, forward rotation of the drive member 11 is also transmitted to the second one-way clutch 23, however, the rotation of the ring gear 34 is faster than that of the drive member 11, so that no rotation is transmitted to the ring gear 34 via the second one-way clutch 23.

The normal speed operating condition is illustrated in FIG. 2. The clutch member 26 is positioned by means of the clutch control mechanism 25 to an intermediate axial position. Forward drive rotation from the drive member 11 is transmitted through the one-way clutch 20 to the pawl body 22 and then through the second one-way clutch 23 directly to the ring gear 34. The third one-way clutch 35 is still in the power transmission state so that the forward rotational drive force of the ring gear 34 is transmitted directly to the hub body 34. In this condition, the forward rotational drive force of the ring gear 34 is also transmitted to the planet gear carrier 52 via the planet gears 51 and from there to a roller 57 which engages the hub cap of a bearing assembly 56. The hub cap of the bearing assembly 56 is fixed to the hub body 4 and acts as a further transmission means of rotational force to the hub body 4. However, the rotational speed of the planet gear carrier 52 is reduced by the planet gears 51 so that rotational transmission through the roller 57 and the hub cap of the bearing assembly 56 is overrun by the faster rotational motion of the third one-way clutch 35.

FIG. 3 illustrates the low-speed transmission path, where the clutch member 26 is now positioned axially to the right hand side in the direction of the drive member 11. In this position, a switching portion 26c of the clutch member 26 has engaged with the clutch pawls 35a to place them in the knocked down state, i.e. the third one-way clutch 35 is the power interruption state. The forward rotation of the drive member 11 is transmitted through the one-way clutch 20 to the pawl body 22 and from there through the second one-way clutch 23 to the ring gear 34. As mentioned, the one-way clutch 35 is knocked down, so that no rotation is transmitted to the hub body 4 at this position. The forward rotation of the ring gear 34 is then transmitted through the planet gear mechanism 5 to the planet gear carrier 52 and from there through the roller 57 and the bearing assembly 56 to the hub body 4. The rotation speed of the ring gear 34 is reduced by the planet gears 51 resulting the low speed transmission condition.

In the above-described internally geared hub, the hub body 4 is linked with the drive member 11 by way of a bearing. The applicant has realized that in some cases a heavy weighted bicycle rider and/or a large number of sprockets on the drive member can result in unsatisfactory running conditions.

Figure 4:
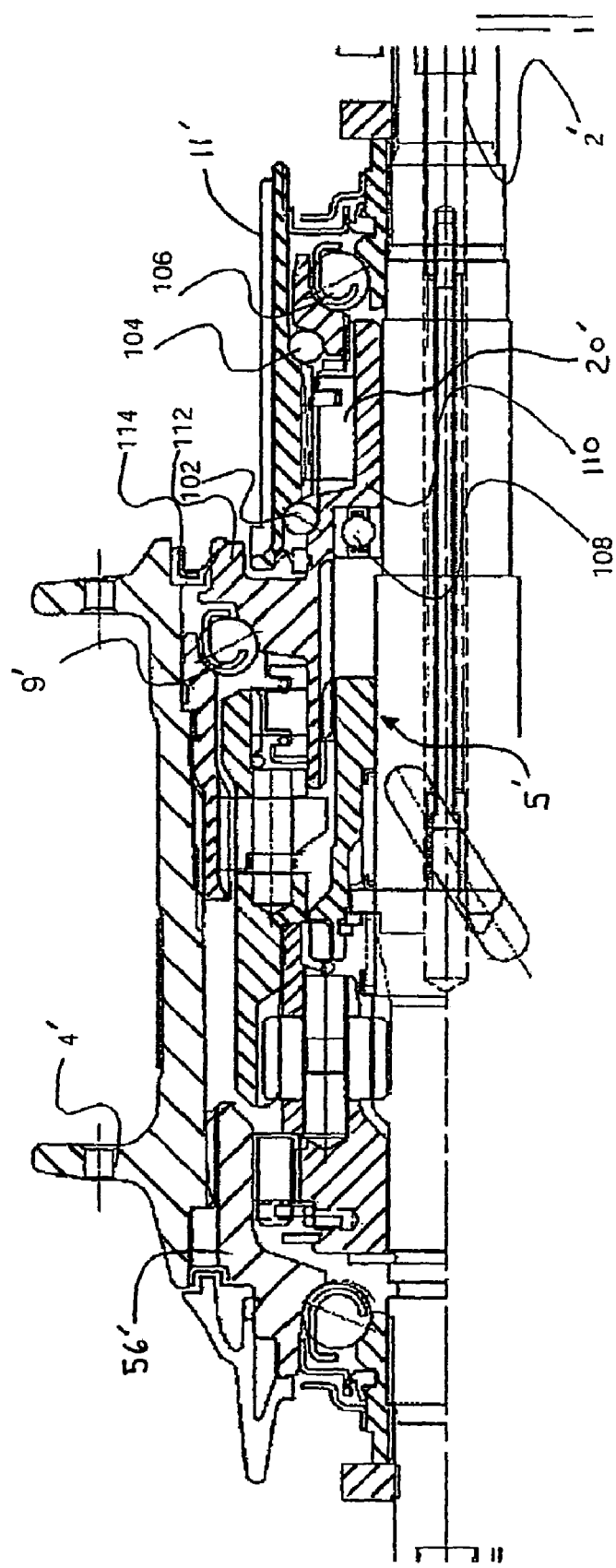
FIG. 4 is a simplified longitudinal cross section view of an internally geared hub in accordance with a preferred embodiment of the present invention.

Accordingly, in the present invention as it is illustrated for a preferred embodiment in FIG. 4, the right-hand side portion of the internally geared hub as been modified substantially, whereas the left-hand side portion according to the above illustration has remained substantially unchanged and accordingly with respect to the construction and the functionality reference can be given to the description of the internally geared hub as known and as indicated above. In view of the similarity between the present invention and the internally geared hub of FIGS. 1 to 3, the parts of the present invention that are functional identical to the parts of the internally geared hub of FIGS. 1 to 3 will be given the same reference numerals as the parts of the internally geared hub of FIGS. 1 to 3, but will include a single prime ('). Moreover, the descriptions of the parts of the present invention that are functionally identical to the parts of the internally geared hub of FIGS. 1 to 3, may be omitted for the sake of brevity.

In the illustrated embodiment of the present invention, as shown in FIG. 4, the internally geared hub basically has a hub axle 2', a hub body 4', a gear mechanism 5' and a drive member 11'. The hub body 4' is coaxially mounted on the hub axle 2' to rotate relative to the hub axle 2'. The drive member 11' is coaxially mounted on the hub axle 2' to rotate relative to the hub axle 2' by a pair of axially spaced drive member bearings 102 and 104 positioned on an inner side of the drive member 11'. The gear mechanism 5' is configured and arranged between the drive member 11' and the hub body 4' to selectively transmit a rotational drive force from the drive member 11' to the hub body 4' in the same manner as in FIGS. 1 to 3 as explained above. A one-way clutch 20' is operatively disposed between the drive member 11' and the gear mechanism 5' in the same manner as in FIGS. 1 to 3 as explained above.

The drive member 11' is substantially sleeve like member that has an outer sprocket support surface. The outer sprocket support surface of the drive member 11' is configured and arranged to support a plurality of sprockets and has a substantially constant radial extension. Preferably, the outer sprocket support surface of the drive member 11' has a plurality of axially extending splines. In the illustrated embodiment, the drive member 11' is configured to be provided with seven sprockets in order to allow a combination with a multi-sprocket assembly. According to the present invention, the hub body 4' and the drive member 11' are mounted in a radially decoupled or uncoupled manner to the hub axle 2' so as to be selectively coupled to the gear mechanism 5'. In particular, the hub body 4' is mounted on the left-hand side via a bearing assembly 56' directly to the hub axle 2'. On the right-hand side or on the side adjacent to the drive member 11', the hub body 4' is supported with respect to an input part 110 of the gear mechanism 5' using a first bearing assembly 9'. The input part 110 is further configured and arranged to support the hub body 4' to the hub axle 2' by additional bearing assembly 108 such that forces imparted onto the hub body 4' can be transferred to the hub axle 2' without interfering radially with the drive member 11'.

The drive member 11' is mounted via a bearing assembly 102 (herein after "drive member bearing") to the same part (input part 110) that is used for supporting the hub body 4'. Accordingly, forces acting onto the drive member 11' are transmitted to the hub axle 2' independently via the drive member bearing 102 and the bearing assembly 108. The remote ends of the drive member 11' are supported with respect to the hub axle 2' using a bearing assembly 104 and a bearing assembly 106.

In the shown embodiment, the bearing assemblies 102 and 104 are provided substantially on opposite end portions of the drive member 11' and are configured to be positioned on both sides of the clutch 20' of the internally geared hub. In other words, there is provided for a further modification with respect to the previously described internally geared hub in that the clutch 20' and the input part 110 are positioned between the drive member 11' and the hub axle 2' in a manner to be substantially decoupled from the radial forces that could be imparted by the hub body 4' since a small connecting portion links the clutch 20' with the remainder of the internally geared hub that is supported such that it extends between the two radially positioned bearing assemblies 102 and 108.

The bearing assemblies 102 and 104 are positioned on the internal side of the drive member 11' facing the hub axle 2' and are furthermore angular contact bearings such that a defined running condition both in radial and axial direction can be provided for, this being particularly achieved by orientating the angular contact bearing in a fashion providing for opposite angularity.

As can be seen furthermore from FIG. 4, a portion (the input part 110) of the gear mechanism 5' extends between a gap formed between the drive member 11 and the hub body 4. This projecting portion 112 which is sealed by a sealing lip 114 in order to protect the bearing assembly 9' allows for an external detection of the shifting situation of the internally geared hub. Furthermore, in the shown embodiment the drive member 11' is mounted such as to extend into a recessed portion of the gear mechanism so as to allow a highly compact transmission design.

Although the present invention has been described in detail by giving reference to the features shown from European Patent Application No. 1 452 437 A1 and with respect to the particularities as illustrated in FIG. 4, it will be apparent to those skilled in the art that the present invention various can be used with other types internally geared hub or hub transmissions.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An internally geared hub comprising:
a hub axle;
a hub body coaxially mounted on the hub axle to rotate relative to the hub axle;
an input part coaxially mounted on the hub axle to rotate relative to the hub axle and the hub body, the input part being at least partially disposed within the hub body;
a drive member coaxially mounted on the hub axle to rotate relative to the hub axle and the input part by axially spaced first and second drive member bearings positioned on an inner side of the drive member, the first drive member bearing bypassing the input part and being mounted between a portion of the drive member and the hub axle, and the second drive member bearing being mounted between a portion of the drive member and the input part;
a one way clutch operably disposed between the input part and the drive member; and
a gear mechanism configured and arranged between the input part and the hub body to selectively transmit a rotational drive force from the input part to the hub body.

2. The internally geared hub according to claim 1, wherein the hub body is at least rotatably supported on the hub axle via the gear mechanism at an axial end of the hub body adjacent the drive member.

3. The internally geared hub according to claim 2, wherein the drive member is at least rotatably supported on the hub axle via the gear mechanism at an axial end of the drive member adjacent the hub body.

4. The internally geared hub according to claim 1, wherein the first and second drive member bearings are positioned on opposite sides of a clutch element that is selectively engagable with the drive member.

5. The internally geared hub according to claim 4, wherein at least one of drive member bearings is an angular contact bearing.

6. The internally geared hub according to claim 4, wherein the first and second drive member bearings are angular contact bearings having opposite angularity.

7. The internally geared hub according to claim 1, wherein the drive member has an outer sprocket support surface configured and arranged to support a plurality of sprockets.

8. The internally geared hub according to claim 1, wherein the gear mechanism has a part with an annular recess in which an axial end of the drive member is disposed.

9. The internally geared hub according to claim 1, wherein the gear mechanism has a part extending into a gap formed radially between an outwardly facing peripheral surface of the drive member and an inwardly facing peripheral surface of the hub body.

10. The internally geared hub according to claim 1, wherein
the gear mechanism has a part extending between an inner bearing rotatably supporting the part on the hub axle and one of the first and second drive member bearings that is closest to the hub body with the inner bearing lying in a single radial plane relative to the hub axle that is adjacent the one of the first and second drive member bearings that is closest to the hub body.

11. The internally geared hub according to claim 1, wherein
the drive member is at least rotatably supported on the hub axle via the gear mechanism at an axial end of the drive member adjacent the hub body.

12. The internally geared hub according to claim 1, wherein
at least one of the drive member bearings is an angular contact bearing.

13. The internally geared hub according to claim 1, wherein
the drive member bearings are angular contact bearings having opposite angularity.

14. The internally geared hub according to claim 1, wherein
the input part is configured to be selectively coupled to the drive member by the one-way clutch positioned axially between the first and second drive member bearings, with the input part being rotatably supported on the hub axle via an additional bearing that is disposed adjacent one of the second drive member bearing that is closest to the hub body.

15. The internally geared hub according to claim 1, wherein
the drive member is further rotatably supported on the hub axle via a pair of additional bearings disposed inwardly of one of the first and second drive member bearings in a radial direction.

16. The internally geared hub according to claim 15, wherein
the gear mechanism has a part that is disposed between one of the first and second drive member bearings and one of the additional bearings.

17. The internally geared hub according to claim 15, wherein
the additional bearings are located within the drive member between opposite axial ends of the drive member.

* * * * *